United States Patent [19]

Schädlich et al.

[11] 4,083,571
[45] Apr. 11, 1978

[54] DRILL CHUCK ARRANGEMENT

[75] Inventors: Fritz Schädlich, Stetten; Heribert Schramm, Stuttgart-Sonnenberg, both of Germany

[73] Assignee: Robert Bosch GmbH, Stuttgart, Germany

[21] Appl. No.: 626,765

[22] Filed: Oct. 29, 1975

[30] Foreign Application Priority Data

Nov. 30, 1974 Germany .................. 7439900[U]

[51] Int. Cl.² .............................................. B23B 31/12
[52] U.S. Cl. .......................................... 279/61; 279/60
[58] Field of Search ................... 279/60, 62, 61, 64, 279/65, 56, 57; 308/DIG. 8

[56] References Cited

U.S. PATENT DOCUMENTS

| 1,620,440 | 3/1927 | Cary | 279/60 |
| 1,776,675 | 9/1930 | Bascom | 279/60 |
| 3,244,428 | 4/1966 | Rohm | 279/60 |
| 3,599,999 | 8/1971 | Schnizler et al. | 279/60 |
| 3,680,877 | 8/1972 | Happe | 279/62 |
| 3,702,705 | 11/1972 | Schadlich | 279/62 |

FOREIGN PATENT DOCUMENTS

| 485,748 | 10/1953 | Italy | 279/60 |
| 520,961 | 3/1955 | Italy | 279/60 |
| 570,945 | 12/1957 | Italy | 279/60 |
| 272,337 | 3/1951 | Switzerland | 279/60 |
| 1,035,672 | 6/1963 | United Kingdom | 279/60 |
| 147,884 | 11/1962 | U.S.S.R. | 279/60 |

Primary Examiner—Francis S. Husar
Assistant Examiner—William R. Briggs
Attorney, Agent, or Firm—Michael J. Striker

[57] ABSTRACT

A drill chuck arrangement for connecting a drill bit to a spindle of a drilling machine comprises a spindle member threaded onto the spindle, and a jaw-actuating member mounted at least in part about the spindle member for concentric turning about the latter. A plurality of opposed clamping jaws are movable towards and away from each other in response to the aforementioned concentric turning. The spindle member has a radial bore which receives a portion of an actuating tool having beveled gear means. Upon turning the tool, the beveled gear meshes with a cooperating gear on the jaw-actuating member so as to turn the same relative to the spindle member, and thereby clamp or release a drill bit inserted in between the clamping jaws. A bushing is provided intermediate the spindle member and the jaw-actuating member to prevent binding between these members.

9 Claims, 2 Drawing Figures

DRILL CHUCK ARRANGEMENT

BACKGROUND OF THE INVENTION

The present invention relates to a drilling machine arrangement and, more particularly, to a drill chuck arrangement which connects a drill bit to a spindle on a drilling machine.

Hand-held drilling machines for working on stone, concrete and similar materials are provided, to an ever-increasing extent, with an adapter which can convert the pure rotary movement of a rotating spindle to a pure axially directed impact-type movement or to a combination movement having both rotary and axial components of motion. The back-and-forth axial movement loosens the connection between the drill bit and the clamping jaws, and therefore requires a relatively firm clamping force.

In one known chuck or clamping jaw attachment, three jaws are provided in a spindle member. The jaws have threads which thread into a guide sleeve. By turning the sleeve with a tool, the jaws are displaced in a direction transverse to the turning axis, and thereby clamp or release a drill bit inserted in between the jaws. However, the jaws of this prior art arrangement have a tendency to automatically open and release the drill bit, especially in impact-type drilling having an axially directed component of motion.

In another known so-called quick-connect chuck used in impact-type drilling, a spindle member is screwed onto the spindle of a drilling machine. A guide member is turnably mounted on the spindle member and is provided with three jaws transverse to the turning axis. The guides for the jaws are surrounded by a guide sleeve which is screwed on the guide member. The rear end of each of the jaws has a radially aligned T-shaped extension which cooperates with a corresponding T-shaped groove of a displaceable member. The displaceable member has a threaded pin at its rear end which is threaded into a left-handed thread provided on the spindle member. In addition, this chuck has a holding ring threaded onto the guide member which prevents the latter from being detached from the spindle member.

This latter prior art chuck clamps a drill bit inserted in between its opposed jaws essentially more firmly than the earlier described three-jawed chuck because of the presence of the left-handed thread connection between the spindle member and the displaceable member. However, this chuck has the disadvantage that it is simple to open because the force required to turn the guide member relative to the spindle member is generated manually. A drill bit is thereby held with a relatively weak clamping force.

Moreover, this chuck has the further disadvantage that it is subject to binding and seizing. The guide member directly engages the spindle member so that they are prone to binding together, thus presenting a considerable force which prevents the jaws from opening, as desired.

SUMMARY OF THE INVENTION

Accordingly, it is a general object of the present invention to overcome the disadvantages of the prior art.

More particularly, it is an object of the present invention to securely hold a drill bit in between opposed clamping jaws, particularly in a drilling machine having an axial component of motion.

An additional object of the present invention is to securely hold a drill bit in between opposed clamping jaws without requiring large turning force to open the jaws.

Still another object of the present invention is to prevent binding between rotating parts of a drilling arrangement.

In keeping with these objects, and others which will become apparent hereinafter, one feature of the invention is embodied in connecting a spindle member with a spindle of a drilling machine arrangement. Jaw-actuating means is mounted at least in part about the spindle member for concentric turning about the axis of the spindle member. A plurality of opposed clamping jaws are also provided which are movable towards and away from each other in response to turning of the jaw-actuating means relative to the spindle member. The spindle member is further provided with a bore for receiving a portion of an actuating tool. Finally, gear means are provided on the jaw-actuating means that are adapted to mesh with cooperating gear means on the tool when the tool portion is received in the bore of the spindle member for turning the jaw-actuating means relative to the spindle member in response to turning of the tool in the bore.

This feature overcomes the drawbacks of the prior art and achieves the objects set forth above in a novel manner. The gear means provided on the guide member of the jaw-actuating means meshes with cooperating gear means on an actuating tool. A portion of the tool is received in one of a plurality of radial bores which is provided in the spindle member, or a part connected with the spindle member. This feature turns the jaw-actuating means relative to the spindle member and has the advantage of providing an adequate clamping force to clamp a drill bit intermediate the opposed clamping jaws.

Another feature of the invention is to interpose anti-friction means, such as a bushing, intermediate the spindle member and the jaw-actuating means. The bushing prevents binding between these two rotating parts.

Another feature of the invention is to interpose a friction ring, such as a conventional O-ring, intermediate the spindle member and the jaw-actuating means.

It is especially desirable if the bushing is constituted of bearing brass comprised of at least 63% by weight of copper, and at least 5% by weight of aluminum, and at least 3% by weight of manganese. Alternatively, it is preferred if the bushing is comprised of cold-formed bearing bronze comprised of at least 7.5% to at most 9% by weight of tin, and at least 0.01% to at most 0.4% by weight of phosphorous.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
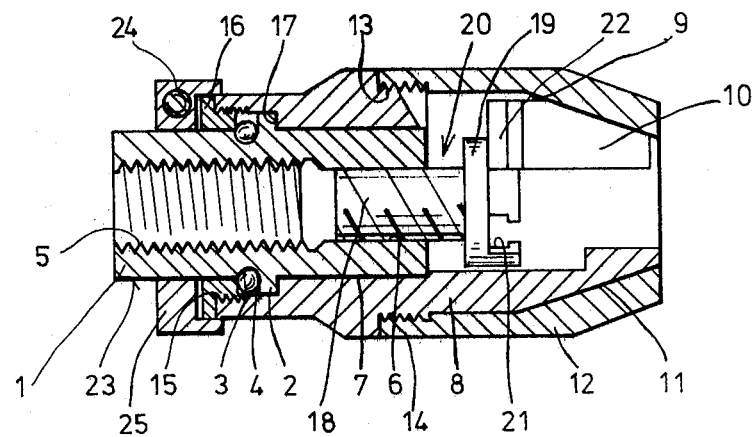
FIG. 1 is a view in vertical section of a drill chuck arrangement according to the prior art.
Figure 2:
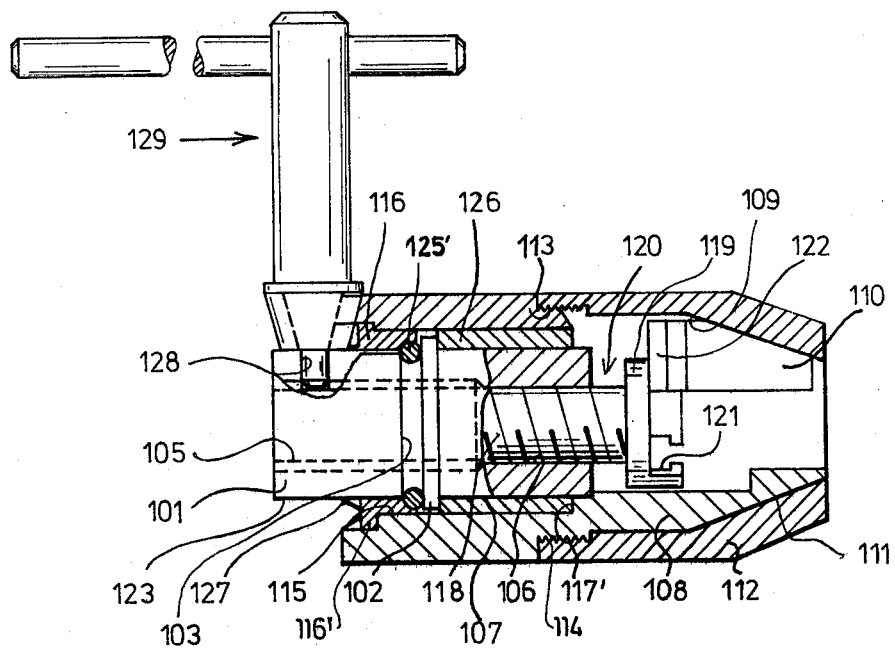
FIG. 2 is a partially removed view in vertical section of a preferred embodiment according to the present invention.

Referring to the drawing, it will be noted that FIG. 1 is a view of a prior art embodiment of a drill chuck arrangement, and that FIG. 2 is a view of an exemplary embodiment of the present invention which connects a drill bit to a spindle of a drilling machine.

Initially, with particular reference to FIG. 2, a first or spindle member 101 is generally cylindrically shaped and bounds an internal passage. An axial extending right-handed thread 105 is provided within this passage at the left side of the spindle member 101 and is adapted to be threaded with the nonillustrated spindle of a drilling machine. On the right side of the spindle member 101, a concentric, axially extending, left-handed thread 106 is provided within the internal passage and is adapted to be threaded with a pin 118 of a displaceable member 120 which guides the movement of the jaws 110.

For ease of description, such directional terms as "forward" or "ahead" are to be construed as movement towards the end of the arrangement at which the jaw 110 are located, i.e., towards the right side of the drawing. Analogously, such directional terms as "rear" or "behind" are to be construed as movement towards the opposite end of the arrangement at which the nonillustrated spindle is connected to the right-handed thread 105, i.e., towards the left side of the drawing.

An annular flange 102 projects radially outwardly of the spindle member 101 and is located in the middle region of the latter. Behind the flange 102, a circumferential groove 103 is provided on the spindle member 101 and accommodates a friction ring 125', such as an O-ring.

A second member or jaw-actuating means surrounds the spindle member 101 for concentric turning about the same. The jaw-actuating means comprises the guide member 108, the guide sleeve 112 and the holding ring 116. Intermediate the spindle member 101 and the jaw-actuating means, a journal-bearing bushing 126 is located and surrounds the forward portion 107 of the spindle member 101. The guide member 108 has a shoulder 117' which abut against a forward end of the bushing 126 whose rear end, in turn, abut against the flange 102. This arrangement prevents the guide member 108 from rearward displacement. To prevent forward displacement, the holding ring 116 which surrounds the rear portion of the spindle member 101 has a projecting portion 116' which engages a shoulder provided on the rear portion of the guide member 108, and a leading portion which is adapted to engage the rear side of the collar 102. The holding ring 116 also in part surrounds and compresses the O-ring 125' which, in turn, urges the ring 116 into tight engagement against the guide member 108. This tight fit interengagement assures that the guide member 108 and the holding ring 116 will turn together.

The forward region 111 of the guide member 108 is generally conically shaped and has in its interior at least three guides 109, each of which is adapted to control the axial movement of the opposed clamping jaws 110. The guide sleeve 112 has a conical forward end which surrounds the guides 109, and a rear threaded end 113 which is adapted to be threaded onto the outer thread portion 114 of the guide member 108, thereby permitting the guide sleeve 112, the guide member 108 and the holding ring 116 to turn as a unit.

The displaceable member 120 comprises a threaded pin 118 which is adapted to be threaded into the left-handed thread 106, and a cylidrical piece 119. At least three T-shaped grooves 121 are radially formed in the cylindrical piece 119 and cooperate with respectively associated T-shaped extensions 122 provided at the rear of the jaws 110.

In order to actuate the jaws 110 so that they can hold a drill bit which has been inserted between the opposed jaws 110, the jaw-actuating means comprising the members 108, 112 and 116 are turned relative to the spindle member 101. This causes the opposed jaws 110 to participate in the turning, and thus the T-shaped extensions 122 mesh with the T-shaped grooves 121 to turn the pin 118 within the left-handed thread 106. The direction of the turning of the jaw-actuating means relative to the spindle member 101 will determine whether the jaws 110 move towards or away from each other, and thus respectively hold or release the nonillustrated drill bit.

In order to more clearly set forth the novel features of the exemplary embodiment, as illustrated in FIG. 2, the prior art embodiment shown in FIG. 1 will now be described. Reference numerals of similar parts have been identified with reference numerals which are reduced by 100.

Thus, spindle member 1 bounds an interior passage having an left-handed thread 6 at its forward end, and a right-handed thread 5 at its rear end. Behind the flange 2, a circumferential groove 3 is provided which, instead of accommodating a friction ring, has an axial thrust ball bearing 4.

The second member or jaw-actuating means again comprises the guide member 8, the guide sleeve 12 and the holding ring 16. Instead of a friction-type interengagement between the holding ring and the guide member, the holding ring 16 has a threaded portion 15 which is threaded into the rear end of the guide member 8. Moreover, the prior art embodiment does not provide a bushing, such as the bushing identified by reference numeral 126 in FIG. 2, between the guide member 8 and the spindle member 1. Otherwise, the turning of the jaw-actuating means relative to the spindle member 1, and the corresponding movement of the jaws 10 in the guides 9 by means of the T-shaped extensions 22 cooperating with the T-shaped grooves 21 of the cylindrical piece 19 which causes the threaded pin 8 to thread into the left-handed thread 6 is as described above. Similarly, the guide member 8 has a shoulder 17 which abuts against the flange 2 to prevent the jaw-actuating means from rearward displacement, and the holding ring 16 has a slight play with respect to the axial thrust bearing 4 and prevents the jaw-actuating means from forward displacement.

At the rear portion 23 of the spindle member 1 behind the flange 2, a clamping ring 25 is clamped to the rear portion 23 by means of the clamping screw 24. The outer surface of the clamping ring 25 is either knurled or milled so as to permit one to easily grip the ring 25 and mount the entire chuck arrangement onto the spindle of a drilling machine.

By contrast, the rear portion 123 of the spindle member 101 is provided with a plurality of radially extending bores, one of which is identified with reference numeral 128. A pin portion of an actuating tool 129 is inserted into bore 128. Conically-shaped gear means 127 is provided at the rear end of the guide member 108 which is adapted to mesh with cooperating conically-beveled gear means on the tool 129. By turning the portion of the tool 129 in the bore 128, the gear means are operative to turn the jaw-actuating means relative to the spindle member 101, and thereby open and close the jaws 110, as described above. The jaws 110, thus firmly clamped with the aid of the tool 129, clamp a drill bit with a clamping force greater than that previously achieved by hand tightening.

In percussion or impact-type drilling, the substance being drilled exerts a force which tends to counteract the general force of the spindle and thereby increases the tightening force existing between the threaded pin 118 and the left-handed thread 106 of the spindle member 101. The O-ring 125' tends to dampen the effect of this tightening force by increasing the friction between the spindle member 101 and the guide member 108. The bearing 126 overcomes the prior art problem of binding between the jaw-actuating means and the spindle member. The bearing 126 serves to transmit radial forces and, for this purpose, is constituted of metallic material having reduced friction characteristics. The bearing 126 is preferably constituted either of high grade bearing brass or, even more preferably, of cold-formed bearing bronze containing phosphorus.

It will be understood that each of the elements described above, or two or more together, may also find a useful application in other types of constructions differing from the type described above.

While the invention has been illustrated and described as embodied in a drill chuck arrangement, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

We claim:

1. In a drill arrangement having a spindle, a combination comprising a spindle member connected with the spindle and having an axis, said spindle member having a bore for receiving a portion of an actuating tool, said spindle member further having a circumferential groove; jaw-actuating means mounted at least in part about said spindle member for concentric turning about said axis; anti-friction means including a cylindrical anti-friction bushing located intermediate said spindle member and said jaw-actuating means for relative rotation and preventing binding between the former and the latter and engaging the same; a plurality of opposed clamping jaws slidably connected to a threaded member which threaded member is threadedly connected to said spindle, said jaws being restrained for rotation relative to said jaw actuating means thereby being movable toward and away from each other in response to turning of said jaw-actuating means relative to said spindle member; gear means provided on said jaw-actuating means and adapted to mesh with cooperating gear means on said tool when said portion of said tool is received in said bore, in turning said jaw-actuating means relative to said spindle member in response to turning of said tool in said bore; and friction means including a friction ring seated in said groove intermediate said spindle member and said jaw-actuating means and frictionally engaging the same for dampening a counteracting force which is exerted by the substance being drilled upon said spindle member.

2. A combination as defined in claim 1, wherin said jaw-actuating means include a holding ring seated in a rear end of another part of said jaw-actuating means and in part surrounding said friction ring so as to be urged into tight engagement by said friction ring against said other part of said jaw-actuating means.

3. A combination as defined in claim 1, wherein said bore extends in part in the radial direction.

4. A combination as defined in claim 1, wherein said bushing is constituted of high grade bearing brass comprising at least 63% by weight of copper, at least 5% by weight of aluminum and at least 3% by weight of manganese.

5. A combination as defined in claim 1, wherein said bushing is constituted of cold-formed bearing bronze comprising at least 7.5% and at most 9% by weight of tin and at least 0.01% and at most 0.4% by weight of phosphorus.

6. A combination as defined in claim 1, wherein said spindle member has an annular flange intermediate its end which abuts a rear end of said bushing, and said jaw-actuating means has a shoulder which abuts a forward end of said bushing.

7. A combination as defined in claim 1, wherein said friction ring is an O-ring.

8. A combination as defined in claim 1, wherein each of said jaws has a T-shaped extension; and further comprising a displaceable member having T-shaped grooves adapted to mesh with the respective T-shaped extensions of said jaws and causing the movement of said jaws during the displacement of said displaceable member.

9. A combination as defined in claim 8, wherein said spindle member has an internal passage provided with a thread; said displaceable member having a threaded portion adapted to be threaded with said internal passage of said spindle member.

* * * * *